United States Patent [19]

Zaitu

[11] Patent Number: 4,561,347
[45] Date of Patent: Dec. 31, 1985

[54] PROCESSOR FOR CONTINUOUSLY COOKING GRAINS

[75] Inventor: Eizo Zaitu, Nara, Japan

[73] Assignee: Shinagawa Machinery Works Co., Ltd., Osaka, Japan

[21] Appl. No.: 614,907

[22] Filed: May 29, 1984

[30] Foreign Application Priority Data

Jun. 1, 1983 [JP] Japan ................... 58-098498

[51] Int. Cl.⁴ ............................................. A47J 37/12
[52] U.S. Cl. ........................................ 99/352; 99/404; 426/511
[58] Field of Search ................. 99/352, 403, 404, 405, 99/406, 443 C; 426/511

[56] References Cited

U.S. PATENT DOCUMENTS

| | | | |
|---|---|---|---|
| 3,561,347 | 2/1971 | Ellis | 99/352 |
| 4,338,344 | 7/1982 | Brooks | 99/404 X |
| 4,385,074 | 5/1983 | Weibye | 426/511 X |

FOREIGN PATENT DOCUMENTS 82058  5/1984  Japan ................... 426/511

*Primary Examiner*—Billy J. Wilhite
*Attorney, Agent, or Firm*—Armstrong, Nikaido, Marmelstein & Kubovcik

[57] ABSTRACT

A process which includes a hopper for feeding grain, a heater for heating the grains disposed below the hopper, a transport conveyor for moving the grains while contacting them with hot water from a hot water tank, a steaming conveyor receiving the grains from the transport conveyor and exposing them to steam for steaming and evaporating excess water therefrom and an outlet at the downstream end of the steaming conveyor.

13 Claims, 4 Drawing Figures

PROCESSOR FOR CONTINUOUSLY COOKING GRAINS

BACKGROUND OF THE INVENTION

1. Field of the Invention:

The present invention relates to a processor for continuously cooking grains such as rice, wheat, beans, corn. More particularly, it relates to a processor for continuously cooking in a short time a large amount of grain, using a minimal amount of water, resulting in cooked grains having a good taste, which are based on a novel cooking method.

2. Description of the Prior Art:

The importance of grains such as rice, wheat, beans, corn or the like has become greater recently as it has been recognized that grains have a high nutritive value and are valuable as a diet food, so that cooking large amounts of grain has become increasingly important.

People of Southeast Asia and the Middle East, in addition to Japanese, Chinese and Koreans, have lived on grains, especially, rice as their main staple. It is well known that in the cooking of rice and/or wheat, the amount of water used and the heating method directly affect the taste of the resulting product.

According to a conventional rice-cooking process, rice is immersed in a certain amount of water so that a certain amount of water enters into each grain of the rice thereby attaining gelatinization. Although the time for absorbing this water depends upon the immersion temperature, it is generally 30 minutes at an ambient temperature. The amount of water needed ranges from 1.1 to 1.2 times by volume the amount of rice when polished rice is used, while the amount of water required for unpolished rice is equal to the volume of the rice. Then, the rice is subjected to a pre-heating step wherein the rice is gently heated in the beginning. This is because if the rice is quickly heated, gelatinization is accelerated on the surface of the rice grains alone thereby reducing the heat-transmission and the water-absorption to the core portion of the rice grain particles, resulting in a half-cooked rice. In order to obtain properly cooked rice, the water is first heated to 70° C. for approximately 10 minutes. As the temperature of the water rises, the water-absorption into the rice grain particles proceeds so that micell bondings in the rice grain particles are released thereby attaining gelatinization on the outer portion of each grain. Then, the water is rapidly brought to a boil so that the starch in the core portion of each grain is gelatinized. Such boiling is continued for about 15 minutes. A certain amount of the boiling water is absorped in to the rice particles and the remainder is evaporated in to the atmosphere, while the rice is cooked by steam produced from the boiling water. Then, the heat is reduced. The lid of a rice-cooking pot must not be opened immediately. When the excessive water on the surface of each grain particle has been evaporated, the heating is stopped. Gelatinization proceeds in the core portion of each rice particle, resulting in properly cooked rice. For complete gelatinization, it generally takes 20 to 30 minutes at a temperature of 98° C.

Such a conventional rice-cooking process consumes too much time (i.e., totaling to 70–90 min.) in order to obtain properly cooked. Moreover, the amount of rice which can be cooked is limited as uniform heat is required for each rice grain. Also, with conventional cooking pots, condensed drops of moisture attach to the cooked rice as the atmosphere in the pot is cooled thereby reducing the taste of the cooked rice and making it sticky. It must also be mentioned that water used for washing or immersing the rice grains causes water pollution.

SUMMARY OF THE INVENTION

This invention was based on a new conception of the inventor that, in order to obtain well-cooked grains, a reasonable amount of water has to be absorbed into grain particles to attain effective gelatinization within the grain particles; for the purpose of such effective gelatinization, instead of a conventional grain-immersion step, grains to be cooked can be heated to about 100° C. in advance to release micell structures and/or micell bondings therein followed by a process of bringing the heated grains into contact with water of the same temperature to allow absorption of the necessary amount of water.

The process utilized in this invention which overcomes the above-discussed disadvantages of the prior art, comprises:

(1) heating washed or unwashed grains to around 100° C., (2) bringing said heated grains into contact with hot water having a temperature of around 100° C., and (3) bringing said grains into contact with steam having a temperature of around 105° C. thereby steaming said grains while evaporating the excessive water on the surface of each grain particle.

The grains in step (1) are heated by steam.

The grains in step (2) are immersed into the hot water. The hot water may be sprayed on the heated grains. The hot water may contain a water-soluble starch derived from the grains.

The continuous type grain processor according to this invention comprises:

a processor body and a tank for supplying hot water to the processor body, said processor body comprising a hopper for feeding the grains thereinto; a heating means, for heating the grains from the hopper, which is disposed under said hopper; a transport means for transporting said heated grains while bringing said grains into contact with said hot water from said tank so that they absorb water; a steaming transport means for transporting said grains from said transport means while bringing said grains into contact with steam thereby steaming them and evaporating the excessive water on the surface of each grain particle; and an outlet, on the lower stream of said steaming transport means, for discharging the resulting cooked grains.

The heating means comprises a heating conveyor belt running from an outlet of said hopper to the upper stream of said transport means; and steam-jet pipes, which are disposed in approximation to said heating conveyor belt. The heating means may comprise a passage below said hopper and a heater for heating said grains passing through said passage. A valve for adjusting the amount of feed-grains is disposed on said passage.

The transport means comprises a hot water container and a conveyor belt running within the hot water in the container and extending to the upper stream of said steaming transport means. The transport means may comprises a spraying means for spraying hot water and a conveyor belt for transporting the grains through the hot water spray from said spraying means. Jet nozzles for emitting steam are disposed on the lower stream of said conveyor belt.

The steaming transport means comprises a steaming conveyor belt extending from the lower stream of said transport means to around said outlet for discharging the cooked grains, and steam-jet pipes disposed in approximation to said steaming conveyor belt. Other jet nozzles for jetting steam are disposed on the lower stream of said steaming conveyor belt.

The heating conveyor belt, the conveyor belt for water-absorbing and steaming conveyor belt engage with at least one infinite variable speed pulley.

Thus, the invention described herein makes possible the objects of (1) providing an apparatus for cooking grains which comprises a rapid heating of grains and a rapid water-absorption of grains, doing away with a conventional conception of grain cooking, thereby uniformly heating the core portions of all grain particles; (2) an apparatus for cooking a large amount of grains such as rice, wheat, and beans in a short time; (3) an apparatus for cooking grains wherein the resulting cooked rice is especially tasty since condensed water does not remain on the cooked rice; (4) providing an apparatus for continuously cooking grains; (5) providing an apparatus for cooking grains which does not cause water pollution; (6) providing a processor wherein since grain particles are directly heated to release micell structures therein thereby making water-absorption easy and then brought into contact with hot water having a temperature of around 100° C., a sufficient amount of water is quickly absorbed into the grain particles so that a rapid and complete gelatinization can be carried out; (7) providing an apparatus wherein a process of the same which can be completed in a shorter time than a conventional process; (8) providing a processor wherein a large amount of grain particles can be continuously treated at the same time thereby maintaining the uniform quality of the cooked grains; and (9) providing a processor which can provide either sticky or soft and fluffy grain as desired.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
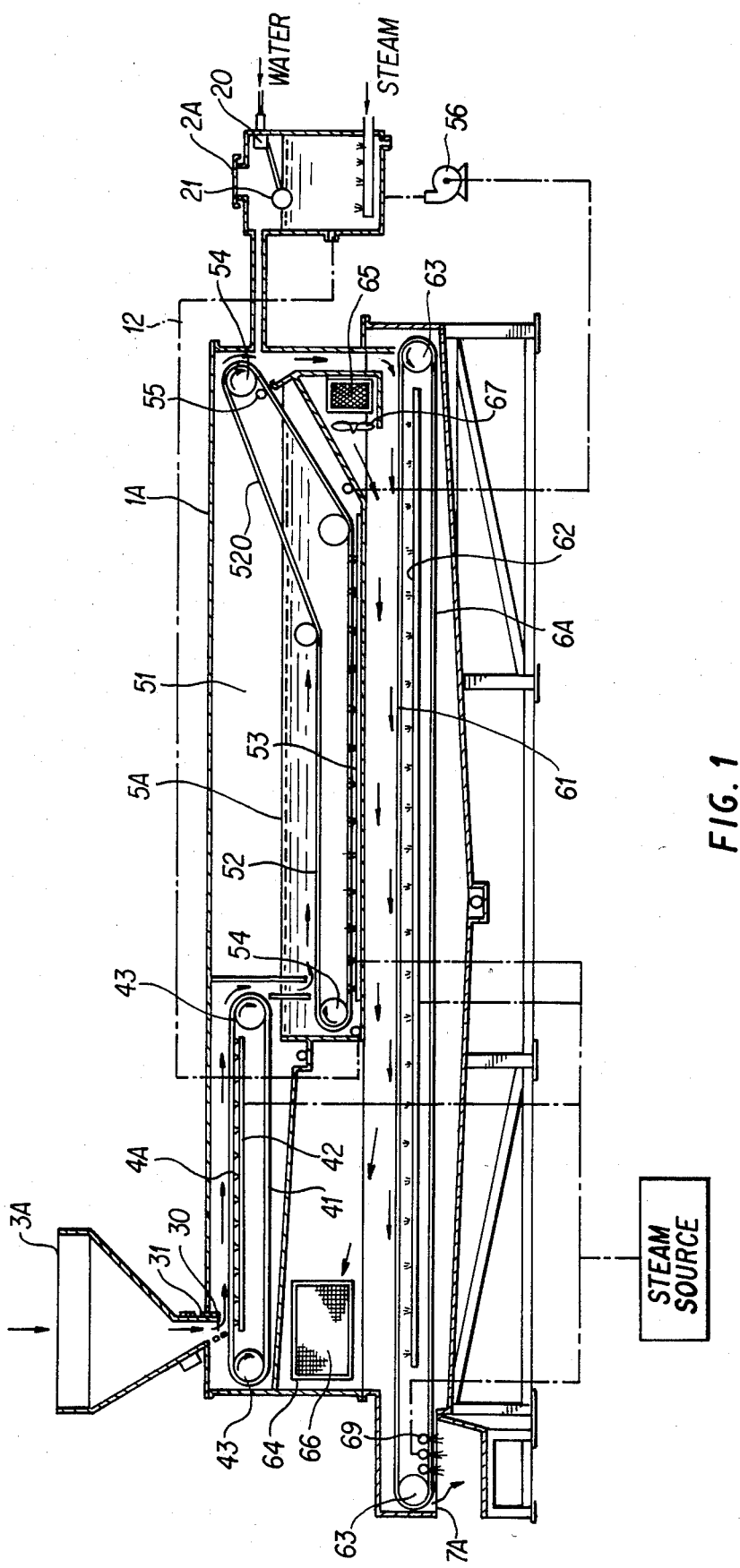
FIG. 1 is a partly sectional side view of a grain processor according to this invention.

The arrangement, function and effects of the invention will now be described with reference to the drawings showing the embodiments of the invention. The following illustrates the most typical examples, but it is to be understood that these are not intended to limit the scope of the invention and that changes and modifications thereof are within the technical scope of the invention.

Grains such as rice, wheat, corn, beans or the like can be cooked in this processor. Said grains can be pre-washed if desired.

The first step of the process utilized in this invention is a heating process, wherein each grain (e.g., rice grain) is sufficiently heated to rise the temperature of its core portion to around 100° C. The heating period is set depending on the kind and grade of rice. Excess heating causes the loss of smell, taste, color or the like, and the generation of a bad odor. Insufficient heating causes insufficient gelatinization of the rice grain in the subsequent steaming step. The preferred heating means is steam.

The second step is a water-absorbing process, wherein the rice grain, the core of which has been heated in the proceeding step enough to release the micell structure therein, is brought into contact with hot water at around 100° C. by passing through said water or being sprayed with it. The contact period is set depending upon the kind and grade of the rice. Excess contact results in excessive water on the rice particles thereby obtaining a sticky rice. Insufficient contact leads to an insufficient absorption of water thereby causing insufficient gelatinization.

Due to the contact of the rice particles with the hot water, water-soluble starch is eluted from the rice particles into the hot water. If the hot water containing water-soluble starch is repeatedly used for cooking successive rice, the batches of resulting boiled rice will be sticky. Alternatively, if the hot water is fresh for each batch, light and fluffy rice will be obtained which is useful for dishes such as fried rice, pilaf, rice for curry and rice, or the like.

The third step is a steaming process, wherein steam having a temperature of around 105° C. comes into contact with the rice particles subjected to the proceeding water-absorption treatment, thereby attaining complete gelatinization not only in the outer portion but also in the core portion of each rice grain and evaporating the extra water on the surface of the rice grains. The period and the temperature required for such contact of the rice grains with steam are set depending upon the kind and grade of the rice. Excess contact causes a burnt taste and/or the loss of smell, taste, color or the like. Insufficient contact causes insufficient gelatinization. An overly high steam temperature accelerates the evaporation of excess water on the surface of each rice grain thereby causing insufficient gelatinization in the core portion of each rice particle. The contact temperature with respect to red beans is preferably set at 108° C. when the temperature is over 108° C., characteristic smell and color of the red beans will be lost. A ventilation system may be applied to this steaming step to control the moisture of the rice and/or atmosphere in this cooking system.

FIG. 1 shows a grain processor of this invention, which comprises a processor body 1A and a boiling water tank 2A which is connected to the processor body 1A by a feeding pipe 12.

The processor body 1A comprises a hopper 3A, a heating means 4A, a transport means 5A, for transporting a water absorbing material such as grain; and a steaming transport means 6A. An outlet 7A for discharging the final product, i.e., the cooked grain, is disposed on the downstream end of the steaming transport means 6A.

The hopper 3A serves to feed a given amount of the grain to be cooked to the heating means 4A on the upstream in thereof. The heating means 4A comprises, for example, a conveyor belt 41 which is disposed to run at a variable speed from around the outlet 30 of the hopper 3A to the upstream end of the transport means 5A, and steam-jet pipes 42 through which steam passes at a temperature of about 100° C. At least one of a plurality of pulleys 43 with which the conveyor belt 41 engages is an infinite variable speed pulley. The belt 41 is usually made of stainless steel, fluorocarbon resin (e.g., Teflon), or the like.

The transport means 5A comprises, for example, a chamber 51 containing a certain amount of hot water and a conveyor belt 52, made of stainless steel, Teflon, or the like, which runs within the hot water in the chamber 51, both of which extend from the downsteam end of the heating means 4A to the upstream end of the steaming transport means 6A. The hot water in the chamber 51 is supplied from the feed tank 2A by means of the pipe 12, the amount of which is controlled by means of a float 21 serving as a feed value in a feed opening 20. In the chamber 51, steam-jet pipes 53 are disposed to maintain the hot water at around 100° C. Their jet nozzles are usually pointed downward to prevent disturbance of the grain particles on the conveyor belt 52 due to the jet of steam therefrom and to accelerate a convection current of the hot water within the chamber 51. The hot water in the chamber 51 can be recycled to the feed tank 2A by the use of a pump 56. The region 520 in the downstream portion of the conveyor belt 52 is preferably exposed from the hot water such that the grain particles conveyed by the belt 52 do not bring extra water into the subsequent steaming step. At the downstream end of the belt 52, jet nozzles 55 are disposed to prevent the grain particles, which have been subjected to the water-absorption treatment, from returning to the water-absorbing step. Since at least one of a plurality of pulleys 54 with which the belt 52 engages is an infinite variable speed pulley, the belt 52 can run at any desired speed.

The steaming transport means 6A comprises, for example, a conveyor belt 61, made of stainless steel, Teflon, or the like which extends from the downstream end of the transport means 5A to around a discharging outlet 7A, and steam-jet pipes 62 which are disposed under the conveyor belt 61. At the downstream end of the belt 61 (namely, around the discharging outlet 7A), other jet nozzles 69 are disposed to prevent the cooked grain particles from returning to the steaming step. Since at least one of a plurality of pulleys 63 with which the belt 61 engages in an infinite variable speed pulley, the speed of the belt 61 can run at any desired speed. A ventilation system 64 may be applied to the steaming step in order to effectively remove the excess water from the grain particles on the belt 61. This ventilation system 64 comprises, for example, an intake 65 and an exhaust port 66 on the wall of the processor body 1A and a fan 67 therebetween. If such a ventilation system is not employed the extra steam from the steaming step may be recycled to the hopper 3A to heat the feed in the hopper 3 in order to save energy.

Figure 2:
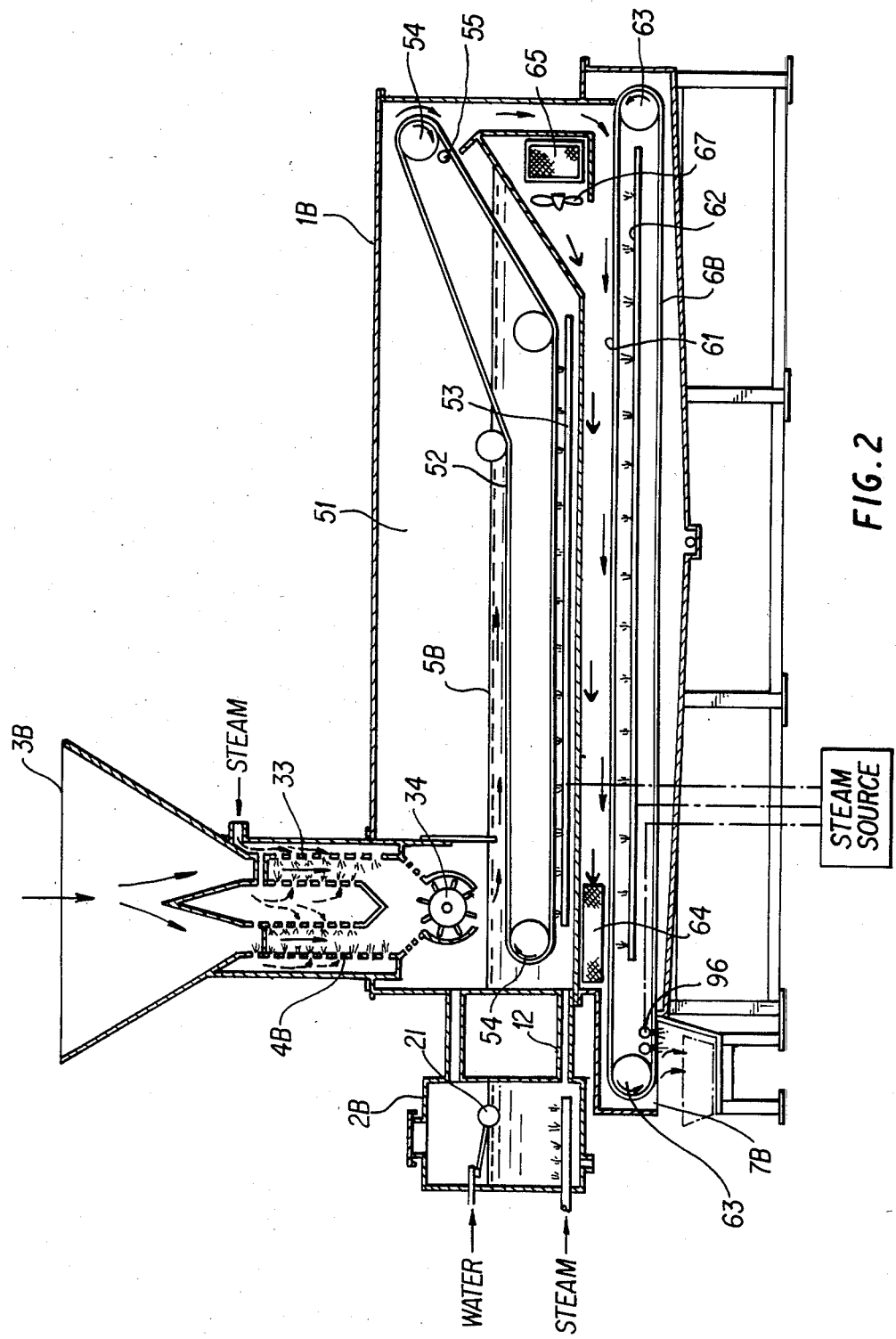
FIG. 2 is a partly sectional side view of another grain processor according to this invention.

FIG. 2 shows another processor according to this invention, which has a passage 33 made of a wire net, etc. below the hopper 3B and a heating means such as steam, both of which compose a heating means 4B. While the grain particles pass through the passage 33, they are heated by steam supplied through the passage 33. A certain amount of the heated grain is fed to the transport means 5B through a control valve 34 of the grain amount which may be disposed below the passage 33.

Figure 3:
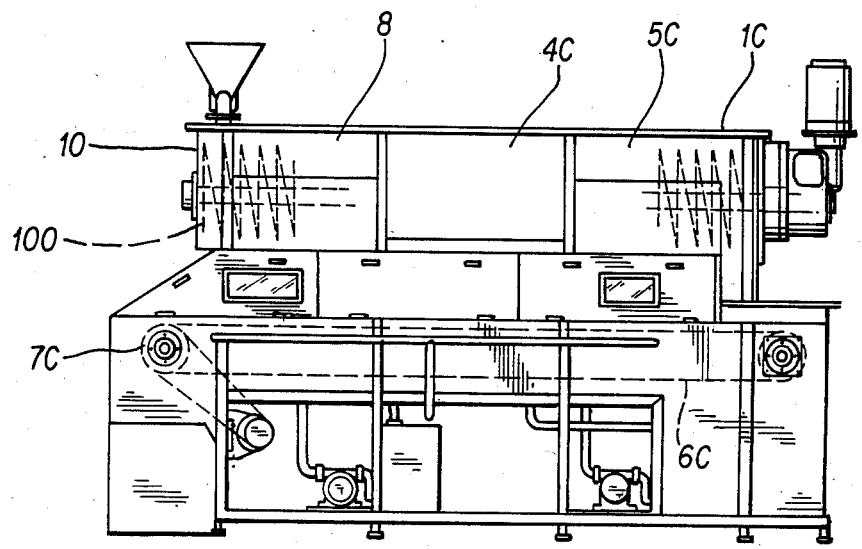
FIG. 3 is a partly sectional side view of another grain processor according to this invention.
Figure 4:
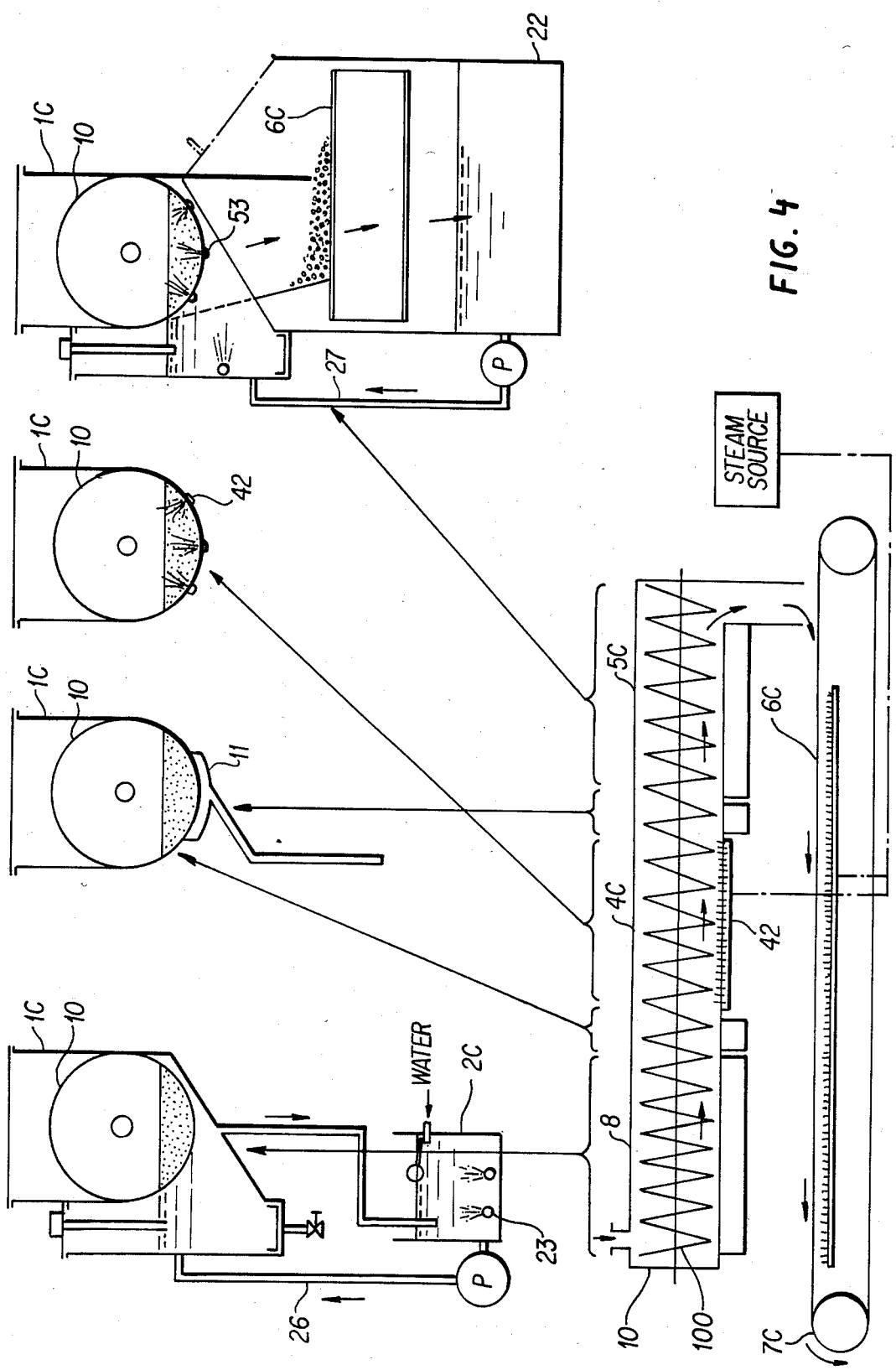
FIG. 4 is a schematic illustration of the processor shown in FIG. 3.

FIGS. 3 and 4 show another processor of this invention, which comprises a meshed drum 10 having a screw conveyor 100 therein. The drum 10 has three sections, each of which serves as a washing means 8, a heating means 4C and a transport means 5C, in turn. A draining system 11 is disposed between the washing means 8 and the heating means 4 and between the heating means 4C and the transport means 5C. A certain amount of water is supplied from a water tank 2C having a heating means such as steam nozzles 23 to the upstream end of the first section 8 (i.e., washing means) of the drum 10. The water may be recycled from the first section 8 to the tank 2C through a recycle pipe 26 by the use of a pump. The second section 4C (i.e., heating means) of the drum 10 has steam jet nozzles 42 to heat the rice grains, the drain from which is discharged by the draining system 11. The third section 5C (i.e., transport means) of the drum 10 contains a certain amount of hot water which is supplied from the tank 22. The hot water is maintained at about 100° C. by steam from jet nozzles 53 disposed around the lower circumference of the drum 10, the drain from which is recycled from the third section 5C of the drum 10 to the tank 22 through the recycle pipe 27 by the use of a pump. The upstream end of the same steaming transport means 6C as shown in FIGS. 1 and/or 2C extends below the downstream end of the third section 5C in the drum 10.

A ventilation means such as a fan which supplies air having a temperature ranging from about 20° C. to about 80° C., may be set around the discharging outlet 7 such that the moisture of the discharged rice from the outlet 7 can be controlled at a desired level. Air of from 50° to 80° C. will produce sticky rice and air of from 20° to 30° C. will produce light and fluffy rice.

Experiment 1

The rice-cooking process is described using the processor shown in FIG. 1.

A certain amount of hot water was supplied from the tank 2A to the chamber 51. A steam was emitted from the pipes 42, 53 and 62 in the heating, the transport and the steaming transport means 4A, 5A and 6A, respectively, by means of a jet nozzle switch (not shown). After conditions in each section were stabilized 500 kg of domestic polished rice were supplied to the hopper 3A without washing, which was then fed to the heating conveyor belt 41 by means of the control valve 31 to form a layer having a thickness of about 1 cm thereon. The rice was transported by the belt 41 through the heating means 4A for about 10 minutes to the subsequent belt 52. The temperature of the surface of each grain particle on the lower stream of the belt 41 was 103° C.

The rice on the belt 52 was transported within hot water having a temperature of 98° C. for about 9 minutes to the lower stream of the belt 52. The weight of the water-absorbed rice on the lower stream of the belt 52 was 1,280 kg. The rice was then conveyed to the steaming belt 61 to which steam having a temperature of 105° C. was emitted from the pipes 62. Then, the rice was transported through the steam by the belt 61 to the discharging outlet 7A, taking about 10 minutes, from which 1,250 kg of the cooked rice was discharged. The entire process took about 30 minutes to complete. The cooked rice was tasty being soft and fluffy having no excess water on the surface of the cooked grain.

Experiment 2

Five hundred kilograms of the same rice as used in Experiment 1 were washed with water for 2 minutes and a half, resulting in a weight of 600 kg of washed rice, and then supplied to the hopper 3 followed by a heating process at 103° C. for 10 minutes. The heated rice was fed to the belt 52 and transported within hot water having a temperature of 98° C. for 6 minutes, and thereafter it was fed to the steaming belt 61 and steamed at a temperature of 105° C. for about 10 minutes followed by discharging from the outlet 7A. The entire process took about 30 minutes to complete. The resulting cooked rice weighed 1,200 kg and was soft and fluffy having no excess water on the surface of the grains.

As seen from the abovementioned experiments, the process of this invention takes only ½ to ⅔ the time required by conventional processes.

What is claimed is:

1. A continuous type grain processor comprising a processor body and a tank for supplying hot water to the processor body;
    said processor body comprising a hopper for feeding the grains thereinto; a heating means, for heating the grains from the hopper, which is disposed under said hopper; a transport means for transporting said heated grains while bringing said grains into contact with said hot water from said tank; a steaming transport means for transporting said grains from said transport means while bringing said grains into contact with steam thereby steaming them and evaporating the excessive water on the surface of each grain particle; means for supplying steam to said steaming transporting means; and an outlet on a downstream end of said steaming transport means, for discharging the resulting cooked grains.

2. A grain processor according to claim 1, wherein said heating means comprises a heating conveyor belt running from around an outlet of said hopper to the upper stream of said transport means; and steam-jet pipes, which are disposed in approximation to said heating conveyor belt.

3. A grain processor according to claim 1, wherein said heating means comprises a passage below said hopper and a heater for heating said grains passing through said passage.

4. A grain processor according to claim 3, wherein a valve for adjusting the amount of feed-grains is disposed on said passage.

5. A grain processor according to claim 1, wherein said transport means comprises a hot water container and a conveyor belt running within the hot water in the container and extending to an upstream end of said steaming transport means.

6. A grain processor according to claim 1, wherein said transport means comprises a spraying means for spraying hot water and a 7. A grain processor according to claim 1, wherein said steaming transport means comprises a steaming conveyor belt extending from a downstream end of said transport means to said outlet for discharging the cooked grains, and steam-jet pipes disposed in approximation to said steaming conveyor belt.

8. A grain processor according to any one of claims 2, 5, 6 or 7, wherein said heating conveyor belt, conveyor belt for water-absorbing and steaming conveyor belt engage with at least one infinite variable speed pulley.

9. A grain processor according to claims 5 or 6, wherein jet nozzles for emitting steam are disposed on a downstream portion of said conveyor belt for water-absorbing.

10. A grain processor according to claim 7, wherein jet nozzles for emitting steam are disposed on a downstream end of said steaming conveyor belt.

11. A grain processor according to claim 1, wherein said processor body further comprises a meshed drum and a rotatable screw conveyor in said drum; said heating means comprises a heating section of said drum and screw conveyor and steam-jet pipes disposed adjacent said heating section; and said transport means comprises another section of said drum and screw conveyor and means for containing a certain amount of hot water partially immersing said another section.

12. A grain processor according to claim 11, further comprising a washing means comprising a first section of said drum and screw conveyor and means for supplying hot water and for partially immersing said first section in said hot water.

13. A grain processor according to claim 12, further comprising a first drain means between said washing means and said heating means and a second drain means between said heating means and said transport means.

* * * * *